Figure 1:
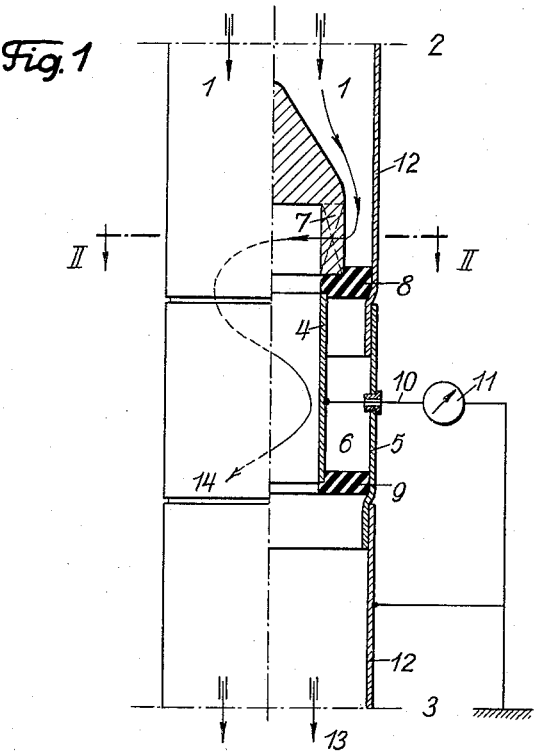

United States Patent Office 2,994,035
Patented July 25, 1961

2,994,035
APPARATUS FOR DETERMINING THE DUST
CONTENT OF GASES OR VAPORS
Eugen Feifel, 10 Stadlergasse, Vienna 13, Austria, and
Rudolf Prochazka, 9 Anzengrubergasse, Vienna 5,
Austria
Filed July 7, 1959, Ser. No. 825,552
Claims priority, application Austria July 19, 1958
4 Claims. (Cl. 324—71)

The present invention relates to an apparatus for determining the dust content of gases or vapors.

The mode of operation of this apparatus is based on the recognition that solid admixtures or liquid admixtures which can form drops in gases or vapors will be contact-electrically charged when they impinge, e.g., in a pileline on the pipe wall, or slide along said wall or are torn from said wall.

Methods of measuring dust content are known, in which the dust content of a certain gas volume is determined by the change in weight (gravimetrically) or by the discoloration (colorimetrically) of a dust-collecting surface or by the loss in intensity of a light ray passed through the dust-laden gas stream (photometrically, e.g., by the Ringelmann method). Such methods require considerable time and expense and have, above all, the disadvantage that they do not enable a continuous measurement giving definite, recordable results and do not permit, therefore, of a continuous observation of the dust content.

It is, therefore, one object of the present invention to provide an apparatus for determining the dust content of gases or vapors which avoids the disadvantages of the known devices. After calibration, which can be effected in a simple manner, it enables the determination of the weight of dust per unit of gas or vapor volume by a continuous measurement of the instantaneous values of the dust content and finally enables also the recording of the measured values.

It is another object of the present invention to provide an apparatus for determining the dust content of gases or vapors which comprises a tube through which the gas-dust mixture flows with a twist (charging tube) and which is provided with an outer shell for shielding the tube against disturbing mechanical, thermal or electrical influences, in which tube a contact-electrical interaction takes place between the tube wall and the dust particles, the contact-electrical charge either of the electrically insulated tube or of the dust particles being discharged to ground through a current measuring instrument. In accordance with the present invention an entrance guide device having at least one tangentially disposed guide passage is provided, in which the dust-laden gases are fed tangentially to the charging tube between planes, which are perpendicular to the longitudinal axis of the charging tube. This entrance guiding device imparts a twist to the gas stream into the charging tube, whereby a tangential stream component overshadows the axial stream component. This tangential stream component causes an effect that nearly all dust particles are centrifugally projected to the inside surface of the tube and, thereby, into intimate contact with this surface of the tube, which brings about a contact-electrical self-excitation and charge of the dust particles, as well as of the electrically insulated charging tube.

In a preferred embodiment the guide device according to the present invention consists of a cylinder which is coaxial with the charging tube and is formed with one or more guide passages and the inside diameter of which corresponds preferably to that of the charging tube.

Figure 2:
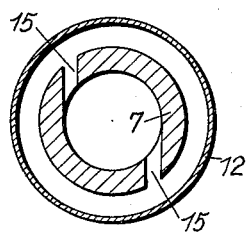

With these and other objects in view which will become apparent in the following detailed description, the present invention will be clearly understood in connection with the accompanying drawing, in which:

FIGURE 1 is an elevation, partly in section, of an apparatus designed in accordance with the present invention; and FIG. 2 is a sectional view taken along the lines 2—2 of FIG. 1.

Referring now to the drawing, the gas-dust mixture flows in the sense of the arrows 1 axially through the inlet cross-section 2 into the housing 12 of the guide device. The tangentially disposed component of flow required for the centrifugal action is imparted to the mixture by causing it to flow through a zone 7 prior to its entrance into the charging tube 4 which is formed as a tangential guide device.

Referring now to FIG. 2, the mixture passes inwardly through tangential guide passages 15, so that it flows through the subsequent charging tube 4 with a twist from which the dust particles are urged outwardly by centrifugal force to the inner surface of the tube 4. This twist and the action of centrifugal force can be well calculated in the arrangement according to the present invention and can be matched to obtain a good overall effect. From the charging tube 4, which is insulatedly mounted at the points 8 and 9, a current is discharged by a conductor 10 through a current measuring instrument 11 to ground. After an appropriate calibration this current provides a measure of the dust content of the gas, which leaves the apparatus in the direction of the arrow 13 with a predominant axial component of flow.

In order to provide a mechanical, thermal and electrical shield for the charging tube 4 against disturbing external influences, the tube 4 is surrounded by a protective shell 5 and a jacket space 6, filled with stagnant gas, is defined between the tube 4 and the shell 5.

In order to enable the introduction of the entire apparatus even into relatively narrow gas passages the zone 7 with its flow surfaces extending mainly normal to the axis is so constructed that the appertaining diameter of the housing 12 is not larger than and preferably as large as the diameter of the protective shell 5 of the charging tube 4.

The gas-dust mixture may also enter the housing 12 in another than in axial direction, e.g., in a plane normal to the axis.

While we have disclosed two embodiments of the present invention, it is to be understood that these embodiments are given by example only and not in a limiting sense, the scope of the present invention being determined by the objects and the claims.

We claim:
1. An apparatus for determining the dust content of gases, comprising an entrance guide device, an electrically insulated charging tube connected to said entrance guide device, means connected to said entrance guide for causing a gas-dust mixture to flow through said tube, a shell surrounding said tube and adapted to screen mechanically, thermally and electrically said tube, and said entrance guide device defining at least one tangential guide passage, in order to feed tangentially said gas-dust mixture to said charging tube between planes disposed perpendicularly to the longitudinal axis of said charging tube and to impart a twist to said gas-dust mixture prior to its entrance into said charging tube, thereby projecting substantially all dust particles centrifugally to the inner surface of said tube and entering into intimate contact with the inner surface of said tube, causing a contact-electrical self-excitation and charge of said dust particles and of said electrically insulated charge tube, means for grounding the current created by said charge on the in- ner surface of said charging tube, and a current measuring instrument disposed in said grounding circuit in order to measure the current flowing from said charging tube to ground.

2. The apparatus, as set forth in claim 1, wherein said entrance guide device has a housing having a greatest diameter no larger than that of said shell.

3. The apparatus, as set forth in claim 1, wherein said entrance guide device comprises a cylinder which is disposed coaxially with said charging tube and has at least one of said guide passages.

4. The apparatus, as set forth in claim 3, wherein said cylinder has an internal diameter equal with that of said charging tube.

References Cited in the file of this patent

UNITED STATES PATENTS

| | | |
|---|---|---|
| 1,168,227 | Schmidt | Jan. 11, 1916 |
| 2,307,602 | Penney et al. | Jan. 5, 1943 |
| 2,538,116 | May | Jan. 16, 1951 |
| 2,825,872 | Stubbs et al. | Mar. 4, 1958 |
| 2,932,966 | Grindell | Apr. 19, 1960 |